United States Patent Office 3,324,057
Patented June 6, 1967

3,324,057
ALKALINE COATING COMPOSITION OF DIALDE-
HYDE STARCH, POLYVINYL ALCOHOL AND
CLAY
Hideo Suzumura and Hisao Miyahara, Kurashiki-shi,
Japan, assignors to Kurashiki Rayon Co., Ltd., Kura-
shiki-shi, Japan, a corporation of Japan
No Drawing. Filed Apr. 19, 1963, Ser. No. 274,299
Claims priority, application Japan, April 27, 1962,
37/17,062
5 Claims. (Cl. 260—17.4)

This invention relates to coatings and is more particularly concerned with coatings for paper.

Polyvinyl alcohol, because of its water-solubility and excellent adhesiveness, has been proposed for use in paper coating for improving the wet friction strength of the surface of coated paper and the printing receptivity of the paper. The wet strength of polyvinyl alcohol, however, is insufficient, and improvement in this respect has been considered necessary. Polyvinyl alcohol can be rendered water-resistant by acetalization with aldehydes. This is clear from the fact that polyvinyl alcohol is used industrially, in the manufacture of vinylon fiber, for example. Such acetalization of polyvinyl alcohol generally requires acid treatment. But coated paper, such as art paper, should have a slightly alkaline surface, because of the need for rapid drying of the ink printed upon it.

The use of a dialdehyde, such as glyoxal, or of dialdehyde starch in the manufacture of art paper and like papers has also been proposed but, in all instances, the coating solution is invariably acid-treated by using an acid catalyst or by reason of the acidity of the components of the coating.

We have proposed compositions for coating paper characterized by a mixture of polyvinyl alcohol, highly siliceous clay, and an alkali silicate or caustic alkali, the viscosity of the aqueous solution of polyvinyl alcohol being lowered by treatment of the polyvinyl alcohol with periodic acid and the like, and the mixture being prepared by adding the highly-siliceous clay and the alkali silicate or caustic alkali to the polyvinyl alcohol solution.

We have now discovered that a highly smooth surface having high whiteness or luster as well as excellent wet friction strength and printing characteristics can be imparted to paper by applying to the paper a coating prepared by mixing dialdehyde starch with an aqueous solution consisting of clay, which is used as a filler pigment, and rendered slightly alkaline by the use of an alkali metal silicate or caustic alkali, and polyvinyl alcohol.

The wet friction strength obtained by the use of a coating consisting of clay, mixed with polyvinyl alcohol and dialdehyde starch, results from the acidity of the clay itself, and is similar to the mechanism of acetalization of polyvinyl alcohol with an aldehyde. However, such acidity seriously interferes with the printing characteristics of the paper, and the iodine ions introduced during the manufacture of dialdehyde starch cause the acid solution to give the paper surface a reddish color. We have discovered, however, that such coloring by iodine ions does not occur under alkaline conditions.

Table 1 below shows the results of a series of tests to measure the drying speed of printed ink and the whiteness or luster of paper coated with coating compositions containing clay, polyvinyl alcohol and dialdehyde starch in accordance with the invention, but using varying amounts of alkaline material.

The following describes the preparation of the coating and the test procedures employed to provide the data in Table 1.

(a) *Preparation of coating solution.*—100 parts of Japanese clay consisting of pyrophyllite, 10 parts of polyvinyl alcohol having a degree of polymerization of 1700 and a degree of saponification of 99.2, and 2 parts of dialdehyde starch were mixed together. The pH of the mixture was varied by adding varying amounts of sodium silicate to it.

(b) *Coating and finishing.*—The solution was manually spread on one side of commercial fine quality paper (weight 75 g./m.$^2$, degree of sizing 58 seconds) using an application bar having a clearance of 10/10,000 inch, and the coating was dried at 80° C. The paper was then treated by passing it four times through the nip of a test super calender under the following conditions:
Temperature 70° C.; roll pressure 100 kg./cm.; moisture content in paper 6 to 7%; speed 23 m./min.

(c) *Ink drying property.*—Anastatic printing of the coated paper was effected with Indian ink using a "Miyakoshi" M-3 printing tester and, 10 minutes later, the printing was offset on white art paper under a pressure of 50 kg./20 cm. In this test, the higher the value the better the drying.

(d) *Whiteness.*—Whiteness or luster was measured with a Hunter whiteness gauge, wherein large figures indicate better whiteness or luster.

TABLE 1

| pH of paper surface | 3.8 | 4.6 | 5.3 | 6.4 | 7.2 | 8.0 | 9.2 |
|---|---|---|---|---|---|---|---|
| Ink drying property | 14.6 | 20.2 | 38.2 | 47.2 | 63.2 | 84.6 | 80.1 |
| Whiteness of paper surface | 73.0 | 77.2 | 85.4 | 88.2 | 89.5 | 89.2 | 89.2 |

As will be seen from the data in this table, the addition of an alkaline material is highly significant and the improvement in the water-resisting properties of polyvinyl alcohol under alkaline conditions is outstanding.

The invention will be further understood from the following specific examples of practical application. However, it will be understood that these examples are not to be construed as limiting the scope of the present invention in any manner. In the examples, all parts are by weight unless otherwise indicated.

Example 1

Two kg. of commercial dialdehyde starch was dissolved with heating in 85 kg. of water. After adding 100 kg. of coating clay to the resulting solution, the mixture was stirred to form a clay slurry of low viscosity. This slurry was then mixed with 66.7 kg. of a 15% aqueous polyvinyl alcohol solution, prepared by dissolving in water, with heating, 10 kg. of polyvinyl alcohol having a degree of polymerization of 1700 and a degree of saponification of 98.2 mol percent, and 4 kg. of an aqueous sodium silicate solution containing 45–49% total solids and having an $S:O_2:Na_2O$ weight ratio of 3.2–3.4. There was thus prepared a paper coating composition having a pH of 9.8 and particularly suitable for coating art paper.

Example 2

Three kg. of commercial dialdehyde starch were dissolved with heating in 85 kg. of water. To the resulting solution there were added 100 kg. of kaolin of Japanese Pharmacopoeia grade. There was also prepared 60 kg. of a 15% aqueous polyvinyl alcohol solution by dissolving in water, with heating, 8 kg. of polyvinyl alcohol having a degree of polymerization of 1700 and a degree of saponification of 98.2 mol percent. To this solution were added 3 kg. of a commercial styrene-butadiene latex and 3.5 kg. of a sodium silicate solution containing 45–49% total solids having an $S:O_2:Na_2O$ weight ratio of 3.2–3.4. The resultant mixture was then combined with the first-mentioned solution containing dialdehyde starch and kaolin to form a coating for art paper having a pH of 9.4.

The coating compositions produced in Examples 1 and 2 were tested in comparison with other coating compositions proposed for paper coating. The same test procedures for whiteness or luster and for the ink drying property were employed. The results are as follows:

TABLE 2

| Type of Coating | Sample No. | | | | | |
|---|---|---|---|---|---|---|
| | 1 | 2 | 3 | 4 | 5 | 6 |
| | Milk casein | Starch | Polyvinyl Alcohol | Treated Polyvinyl Alcohol [1] | Example 1 | Example 2 |
| Amount of binder (percent to pigment) | 15 | 20 | 10 | 10 | 10 | 11 |
| pH of paint | 10.2 | 5.2 | 5.5 | 11.4 | 9.8 | 9.4 |
| pH of paper surface | 8.2 | 5.2 | 5.1 | 9.4 | 7.2 | 7.0 |
| Surface strength (Wax No.) | 7 | 5-6 | 7 | 7 | 7 | 7 |
| Number of times of wet friction (TAPPI method) | Over 10 | 2 | 3 | Over 10 | Over 10 | Over 10 |
| Luster or whiteness of white paper (75°/75°), percent | 27.2 | 22.0 | 38.0 | 33.2 | 42.2 | 41.4 |
| Luster or whiteness of surface solid-printed with Indian ink (75°/75°), percent | 77.5 | 54.2 | 47.2 | 73.2 | 80.8 | 82.1 |
| Ink drying property | 62.0 | 30.8 | 32.1 | 78.2 | 63.2 | 62.9 |

[1] Coating solution consisting of polyvinyl alcohol reacted with periodic acid, highly-siliceous clay, and caustic alkali.

The materials and the relative relationships set forth in the examples are those preferred in carrying out this invention, but it will be understood that other materials and relationships may be used within the scope of the invention. In general, unless otherwise indicated, conventional operations and techniques and conventional substances are suitably employed in forming the coating compositions of this invention.

Thus, the polyvinyl alcohol suitable for use in accordance with the present invention is commercial polyvinyl alcohol and includes polymers composed principally of the vinyl alcohol radical, but is not limited to pure polyvinyl alcohol. Polyvinyl alcohol is a polymer containing hydroxyl groups and corresponding to the formula:

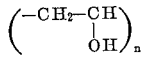

wherein $n$ is an integer which can vary within wide limits, as is well-known in the art. Polyvinyl alcohol can be produced from the corresponding polyvinyl ester, e.g. polyvinyl acetate, by alkaline or acid saponification or re-esterification, i.e. alcoholysis, in accordance with the following equation:

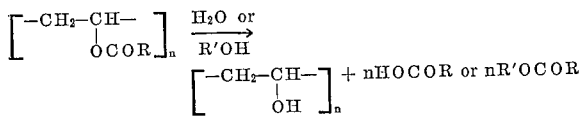

Typical polyvinyl alcohols which can be suitably used are described, for example, in Cline et al. U.S. Patent 2,636,803.

The polyvinyl alcohol may be of the fully or partially-saponified type. The degree of polymerization of the polyvinyl alcohol, upon which viscosity is dependent, may vary widely but is suitably at least about 1000. Commercial polyvinyl alcohol is dissolved in water. The amount of polyvinyl alcohol employed, and thus the concentration of the resulting solution, will generally vary, depending upon the degree of polymerization of the polyvinyl alcohol, but concentrations of 5 to 15% by weight are preferred.

Similarly, the pigment-filler is of commercial grade and is suitably any highly siliceous material such as the clay referred to above, kaolinite ($Al_2O_3 \cdot 2SiO_2 \cdot 2H_2O$) and silica ($SiO_2$), or a clay such as kaolin. In like manner, commercial alkali metal silicates are used, the quantities used being based on dry weight. When kaolinite and silica are used as the pigment, the alkali metal silicate may be formed in situ by adding an alkali metal hydroxide, e.g.

sodium hydroxide. The components are thoroughly and uniformly mixed together until a smooth composition is produced.

The chemical reactions involved, particularly in the case of in situ formation of alkali metal silicate are believed to be as follows:

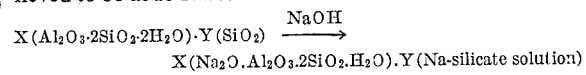

Sufficient alkaline material is used to provide an alkaline pH, preferably a pH of at least 9. The amount of clay can vary but is most advantageously at least twice the amount of polyvinyl alcohol and may be fifteen times by weight the amount of polyvinyl alcohol.

The dialdehyde starch which is employed is a well-known commercial product and a typical dialdehyde starch is described, for example, in "Industrial and Engineering Chemistry" vol. 52, No. 3, March 1960, page 201–206 "Dialdehyde Starch Using Electrolytic Regeneration of Periodic Acid."

The amount of dialdehyde starch can also vary but most suitably the amount is 1.0 to 100% by weight of the amount of polyvinyl alcohol.

As shown in Example 2, an elastomer latex may also be combined with the other constituents in the coating of this invention and this elastomer latex may be natural rubber latex or a synthetic rubber latex such as the butadiene-styrene latex used in Example 2. In general, the elastomer latex will replace some of the polyvinyl alcohol which would normally be present. It will also be understood that other materials conventionally used in paper coating compositions, such as dispersants, activators, pigments, and the like may be used. When pigments are used they may be subsituted for part of the claim. Similarly, the polyvinyl alcohol may be partially substituted by starch, casein, or like material used in conventional paper-coating compositions.

The amount of water used in the composition is selected to give the composition the viscosity of fluidity which is necessary for the particular manner of application which is to be employed with it, in accordance with conventional practice in the paper-coating art.

It will also be understood that various changes and modifications in addition to those indicated above may be made in the embodiments herein described without departing from the scope of the invention as defined in the appended claims. It is intended, therefore, that all matter contained in the foregoing description shall be interpreted as illustrative only and not as limitative of the invention.

We claim:
1. A coating for paper consisting essentially of an aqueous composition containing polyvinyl alcohol, clay, and dialdehyde starch, said composition containing an alkaline substance in sufficent quantity to render the composition alkaline.

2. A coating for paper consisting essentially of an aqueous composition containing polyvinyl alcohol, clay, and dialdehyde starch, said composition containing an alkaline substance in sufficient quantity to render the composition alkaline, said alkaline substance being selected from the group consisting of alkali metal silicates and alkali metal hydroxides.

3. Paper coated with a coat deposited on said paper by evaporation of water from an aqueous composition consisting essentially of polyvinyl alcohol, clay, dialdehyde starch, and an alkaline substance in sufficient quantity to render the composition alkaline.

4. Paper coated with a coat deposited on said paper by evaporation of water from an aqueous composition consisting essentially of polyvinyl alcohol, clay, dialdehyde starch, and an alkaline substance in sufficient quantity to render the composition alkaline, said alkaline substance being selected from the group consisting of alkali metal silicates and alkali metal hydroxides.

5. A coating for paper as defined in claim 1, wherein said composition further includes an elastomer latex.

References Cited
UNITED STATES PATENTS

| | | | |
|---|---|---|---|
| 2,537,114 | 1/1951 | Young et al. | 260—8 |
| 3,169,073 | 2/1965 | Weakley et al. | 106—139 |

FOREIGN PATENTS

| | | |
|---|---|---|
| 468,031 | 9/1950 | Canada. |

WILLIAM H. SHORT, *Primary Examiner.*

SAMUEL H. BLECH, J. NORRIS,
                                  *Assistant Examiners.*